(12) United States Patent
Jee

(10) Patent No.: US 6,477,776 B1
(45) Date of Patent: Nov. 12, 2002

(54) ROTATIONAL PEELING PLIER

(75) Inventor: Beam-Chi Jee, Tu Cheng (TW)

(73) Assignee: Hanlong Industrial Co., Ltd., Taipei Hsien (TW)

( * ) Notice: Subject to any disclaimer, the term of this patent is extended or adjusted under 35 U.S.C. 154(b) by 0 days.

(21) Appl. No.: 09/632,610

(22) Filed: Aug. 4, 2000

(51) Int. Cl.[7] .......................... H02G 1/12; B21F 13/00
(52) U.S. Cl. ..................... 30/90.1; 30/91.2; 81/9.44
(58) Field of Search .......................... 30/90.1, 279.6, 30/278, 146, 91.2; 81/9.4, 9.44

(56) References Cited

U.S. PATENT DOCUMENTS

| | | | | |
|---|---|---|---|---|
| ,878,493 A | * | 2/1908 | Barnes | 81/9.44 |
| 2,725,774 A | * | 12/1955 | Tekse | 30/329 |
| 3,665,603 A | * | 5/1972 | Bilbrey et al. | 30/91.2 |
| 3,826,001 A | * | 7/1974 | Bilbrey et al. | 30/142 |
| 3,864,828 A | * | 2/1975 | Bilbrey et al. | 30/90.7 |
| 4,489,490 A | * | 12/1984 | Michaels et al. | 30/90.1 |
| 4,829,671 A | * | 5/1989 | Cheng | 30/90.1 |
| 4,955,137 A | * | 9/1990 | Matthews | 30/90.1 |
| 4,958,433 A | * | 9/1990 | Persson | 30/90.1 |
| 4,979,299 A | * | 12/1990 | Bieganski | 30/90.1 |
| 5,009,130 A | * | 4/1991 | Bieganski | 30/90.1 |
| 5,887,346 A | * | 3/1999 | McCasland | 30/90.1 |
| 6,253,641 B1 | * | 7/2001 | Tarpill | 81/9.44 |

* cited by examiner

*Primary Examiner*—Boyer D. Ashley
*Assistant Examiner*—Thomas J Druan, Jr.
(74) *Attorney, Agent, or Firm*—Bacon & Thomas, PLLC

(57) ABSTRACT

A pair of rotational peeling pliers. The pliers include an upper and lower half part and an adjustment member, wherein, the middle sections of the upper and lower half parts are connected to form an upper and a lower clamping arm on the front section as well as an upper and lower handle on the rear section of the pliers. The upper clamping arm has a knife, and the lower clamping arm has wire recesses. When one of the recesses is filled by a wire, and the upper and lower clamping arms are pressed to get close to each other, the knife cuts into an outer insulation layer on the wire to peel it. The adjustment member includes a fixing seat, the knife and an adjustment portion. The fixing seat is inserted in the receiving groove with the bottom thereof fixedly clamping the knife.

1 Claim, 5 Drawing Sheets

ROTATIONAL PEELING PLIER

BACKGROUND OF THE INVENTION

1. Field of the Invention

The present invention is related to improvement of a pair of rotational peeling pliers, and especially to improvement of a pair of rotational peeling pliers of which the distance between a cutting knife and wire recesses can be adjusted to suit wires of various sizes, so that peeling of the wire pliers can be more perfect.

2. Description of the Prior Art

Referring to FIG. 1, it is depicted therein a pair of conventional peeling pliers with a left half part 1 and a right half part 2 of the pliers having long handles. The left and right half parts 1, 2 of the pliers have therebetween a pivot 3 with the handles 4, 5 behind it and clamping arms 6, 7 in front of it. The corresponding sharp edges of the clamping arms 6, 7 facing to each other are provided thereon with corresponding semi-circle recesses 8 for peeling and cutting sections 9.

The clamping arms 6, 7 form circles from the mutual opposite semi-circle recesses 8, while the cutting sections 9 are parallel to these circles in a line. When a wire is placed in the recesses 8 on one of the clamping arms 6, 7, and the handles 4, 5 are pressed to get close, the outer insulation layer of the wire can be cut in by the recesses 8 of the clamping arms 6, 7, then the peeling pliers are pulled axially, the insulation layer of the wire can thus be peeled and the inner core of the wire can thus be revealed.

Although the stated peeling pliers can get the basic function of peeling the insulation layer of an electric wire, the peeling pliers must be provided on the clamping arms 6, 7 thereof with recesses 8 of various sizes to suit wires of various specifications and coarseness. In this way, the clamping arms 6, 7 will be overly long, thereby, length of the handles 4, 5 must be longer than those of the clamping arms 6, 7 to get the object of saving operating force, these render the whole pliers to be overly long, and overly bulky and unfavorable to operation and storage.

Therefore, before the present invention, the inventor of the present invention had developed a pair of rotational peeling pliers with an upper half part 10 and a lower half part 20 (as shown in FIG. 2). The middle sections of the upper and the lower half parts 10, 20 are connected with each other, and form an upper clamping arm 11 and a lower clamping arm 21 on the front section of the pliers as well as an upper handle 12 and a lower handle 22 on the rear section of the pliers. The upper and the lower handles 12, 22 are mounted therebetween an elastic member 13 to maintain the normal close state of the upper and the lower clamping arms 11, 21.

One of the upper and lower clamping arms 11, 21 is provided with a knife 14, while the other is provided with "V" and "U" shaped recesses 23. When the upper and lower clamping arms 11, 21 get close to each other, distance between the knife 14 and the recesses 23 is controlled by an adjustment member 24, (as shown in FIG. 3, 4).

When one of the recesses 23 is given an electric wire to lie therein, and the upper and lower clamping arms 11, 21 are pressed to get close to each other, the knife 14 cuts into the outer insulation layer of the wire to make peeling of the outer insulation layer easy by rotational cutting of the peeling pliers, and to suit wires of various specifications and coarseness.

The above stated structure has been highly appraised in the art. According to investigation of the inventor who is the same inventor as that of the present invention, if the distance between the knife 14 and the recesses 23 is too large by control of the adjustment member 24, as is shown in FIG. 4, a quite large gap will be obtained between the upper and lower clamping arms 11, 21, and a user may have the pliers carried therewith wrangled by hooking some thing, this may create inconvenience.

SUMMARY OF THE INVENTION

Thereby, the inventor of the present invention further developed a pair of rotational peeling pliers, in order to get rid of such inconvenience, so that peeling of the wire pliers can be more perfect.

In particular, the rotational peeling pliers of the present invention is comprised mainly of an upper half part, a lower half part and an adjustment member, wherein, the middle sections of the upper and the lower half parts are connected with each other to form an upper and a lower clamping arm on the front section of the pliers as well as an upper and a lower handle on the rear section of the pliers. The upper clamping arm is provided with a knife, the lower clamping arm is provided with wire recesses. When one of the recesses is given an electric wire to lie therein, and the upper and lower clamping arms are pressed to get close to each other, the knife cuts into the outer insulation layer of the wire to peel the outer insulation layer. The present invention is characterized by: the upper clamping arm is provided with a receiving groove which is further provided on the upper portion thereof with a positioning groove. The adjustment member includes a fixing seat, the above mentioned knife and an adjustment portion, wherein, the fixing seat is inserted in the receiving groove with the bottom thereof fixedly clamping the knife. The blade of the knife is revealed at the lower edge of the upper clamping arm, a rod is extended from the fixing seat to the positioning groove. The adjustment portion is provided above the positioning groove, the bottom thereof is provided with a connecting slot to connect with the rod by means of threads. When in rotating the adjustment portion, the rod of the fixing seat can be moved up and down in the connecting slot to adjust the distance between the knife and the wire recesses. In this way, the peeling pliers can suit wires of various sizes, and can protect the hands of a user from damage.

Additionally, when the present invention adjusts in pursuance of coarseness of the wires, it adjusts directly the distance between the knife and the wire recesses. There will be no gap generated between the upper and lower clamping arms, so that the present invention will not have inconvenience such as being wrangled by hooking something, thereby, peeling of the wire pliers can be more perfect.

The present invention will be apparent in its practical structure after reading the detailed description of the preferred embodiment thereof in reference to the accompanying drawings.

DETAILED DESCRIPTION OF THE PREFERRED EMBODIMENT

Figure 1:
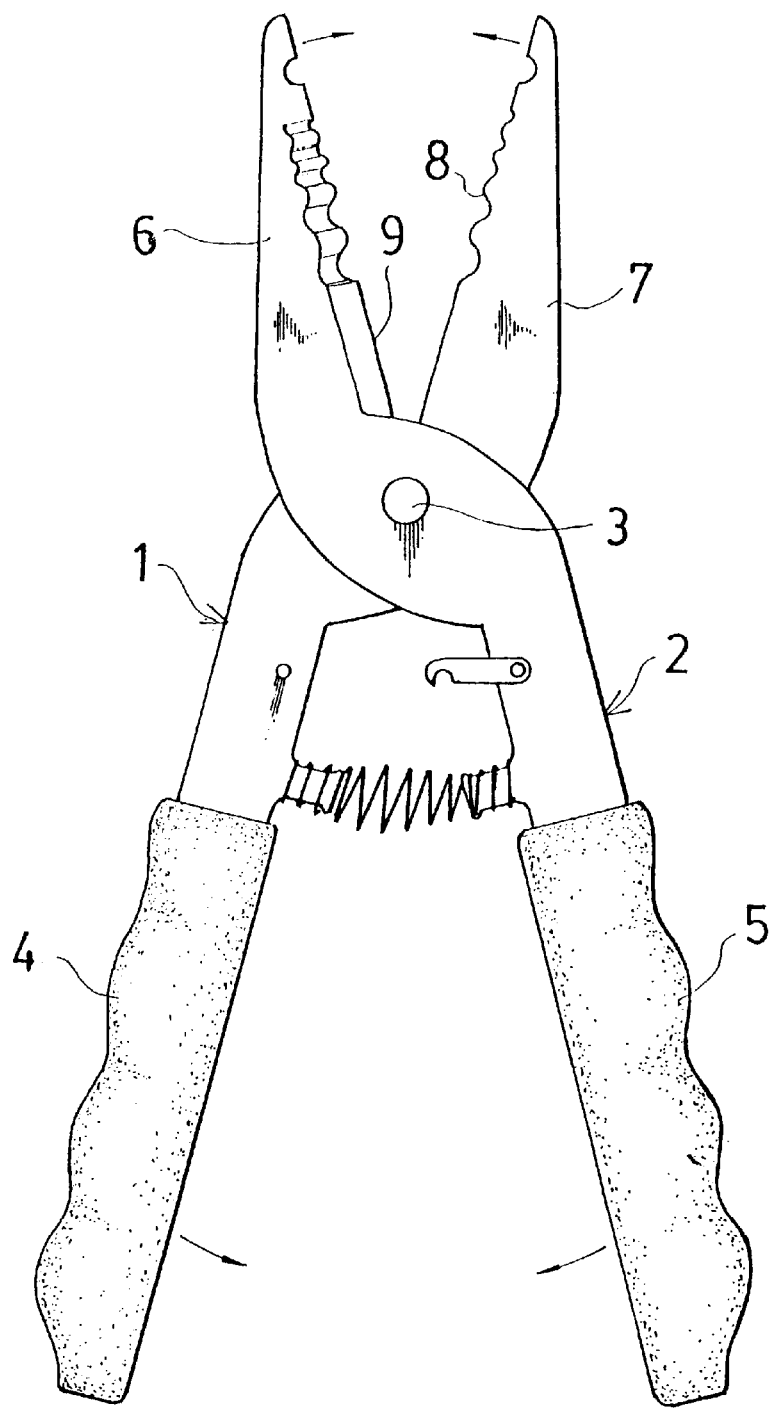
FIG. 1 is a front view showing a pair of conventional peeling pliers with long handles.
Figure 2:
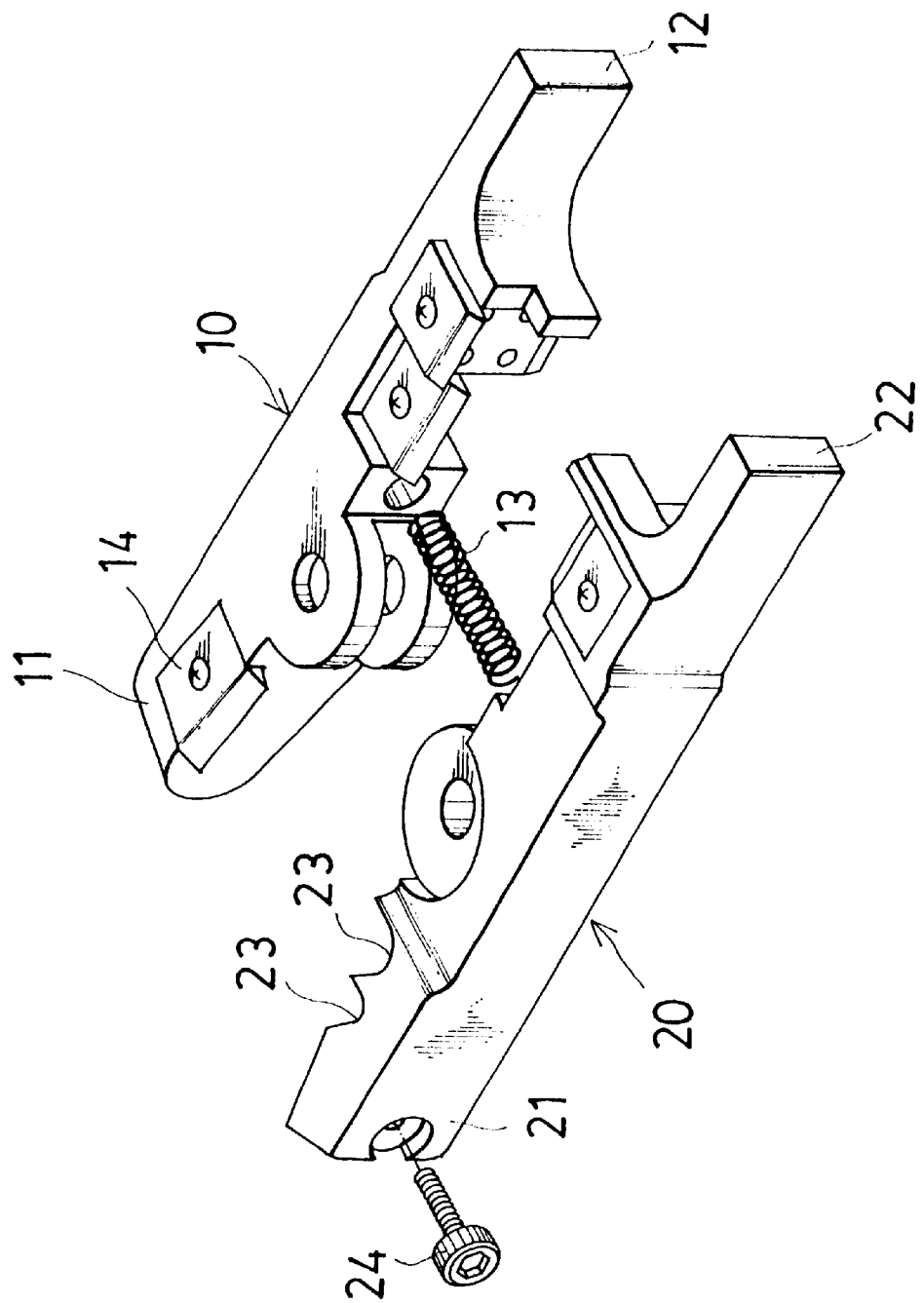
FIG. 2 is an analytical perspective view of a pair of earlier rotational peeling pliers.
Figure 3:
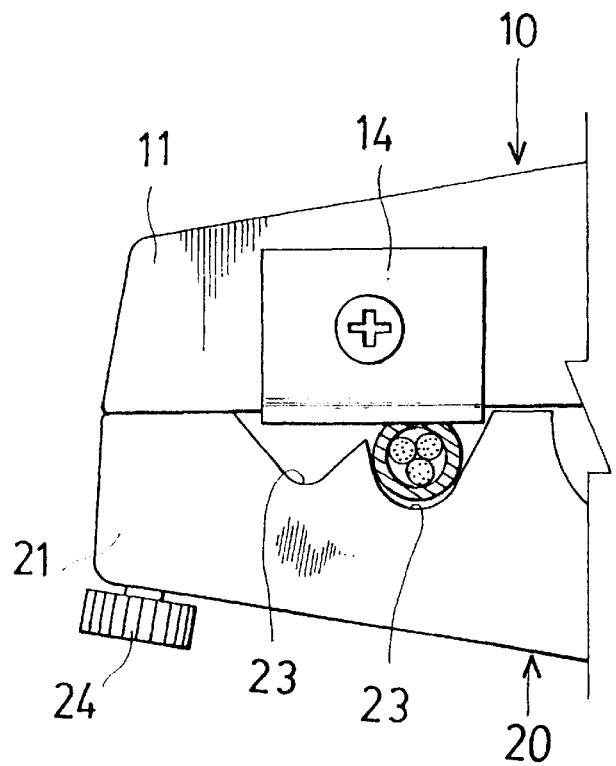
FIG. 3 is a schematic view showing use of the earlier rotational peeling pliers of FIG. 2.
Figure 4:
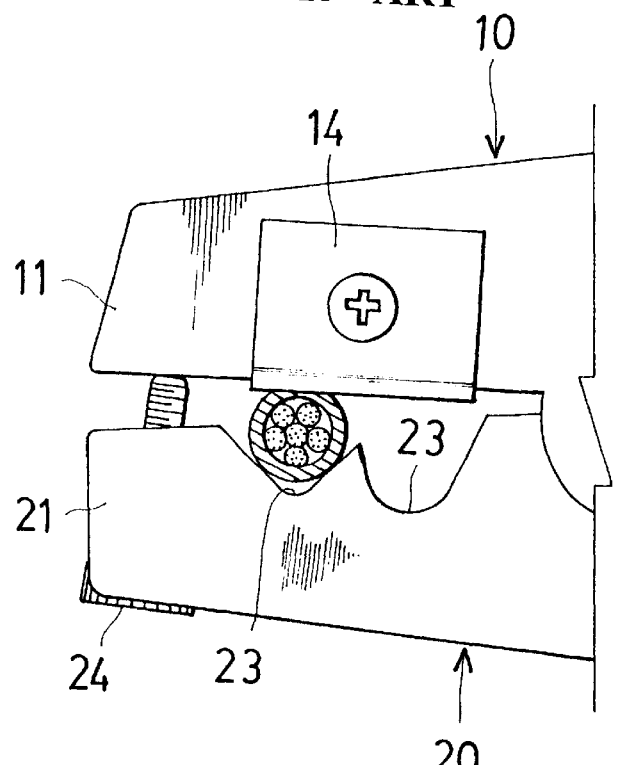
FIG. 4 is another schematic view showing use of the earlier rotational peeling pliers of FIG. 2.
Figure 5:
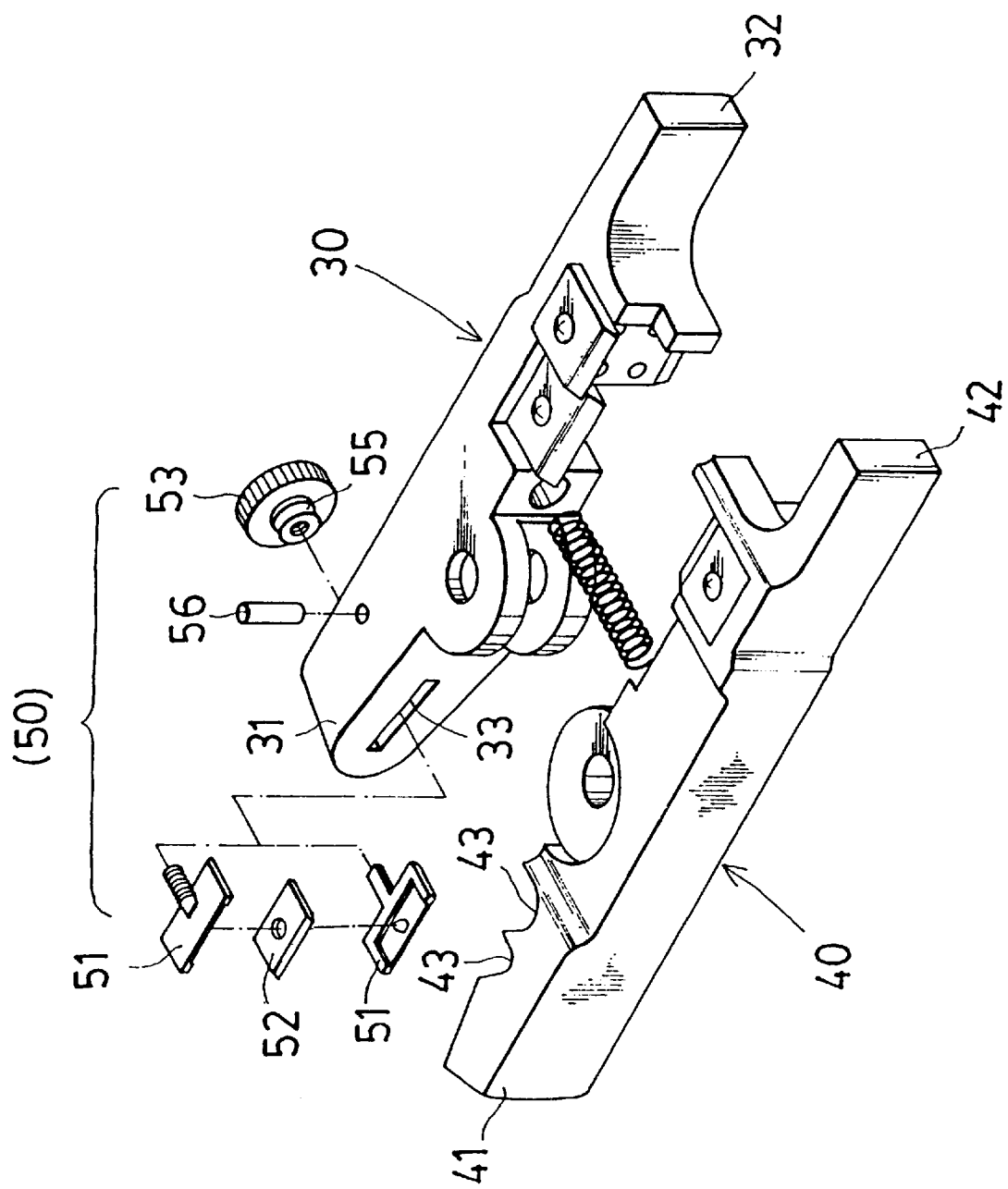
FIG. 5 is an analytical perspective view of a pair of rotational peeling pliers of the present invention.
Figure 6:
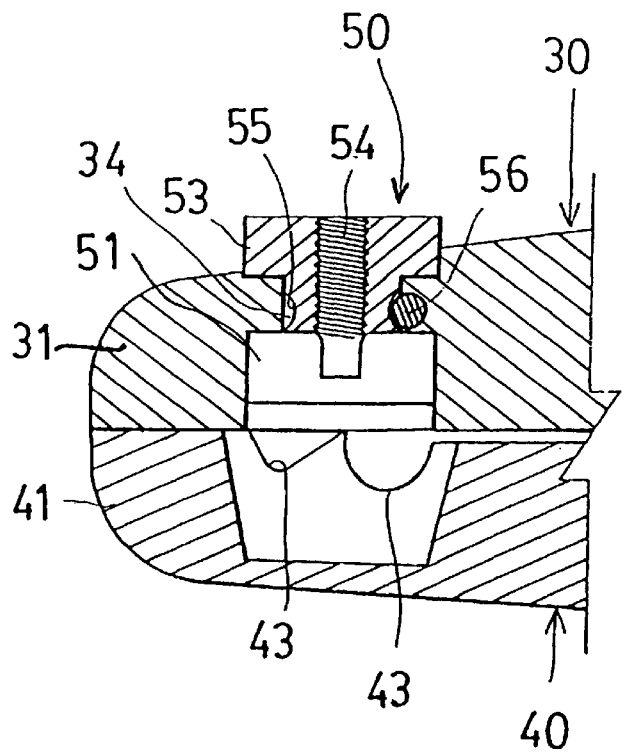
FIG. 6 is a schematic sectional view showing use of the rotational peeling pliers of the present invention with the blade retracted in the upper clamping arm.
Figure 7:
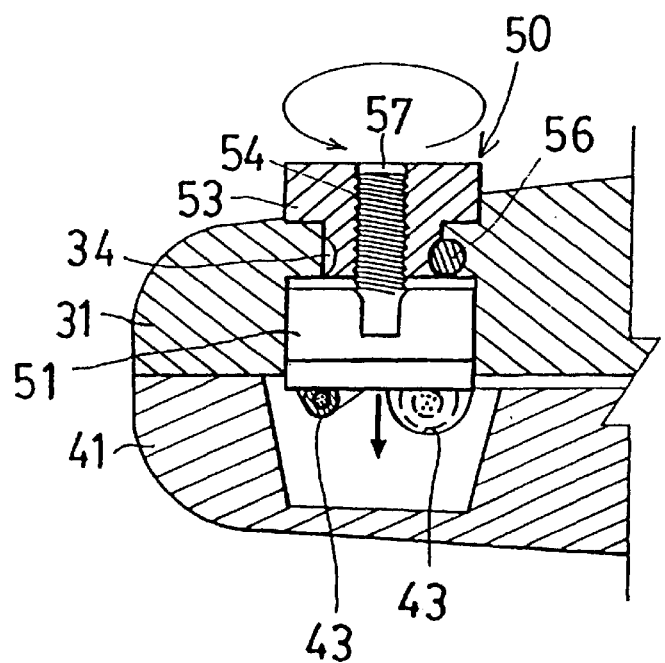
FIG. 7 is another schematic sectional view showing use of the rotational peeling pliers of the present invention.

Referring to FIGS. 5–7, the drawings are depicted to disclose the rotational peeling pliers of the present invention that is characterized An upper half part 30 thereof is provided with an upper clamping arm 31 on the front section of the pliers, and is provided with an upper handle 32 on the rear section of the pliers. The upper clamping arm 31 is provided with a receiving groove 33 which is further provided on the upper portion thereof with a positioning groove.

A lower half part 40 thereof is provided with a lower clamping arm 41 on the front section of the pliers, and is provided with a lower handle 42 on the rear section of the pliers. The lower clamping arm 41 is provided with a plurality of "V" and "U" shaped wire recesses 43 in opposition to the receiving groove 33 on the upper clamping arm 31.

An adjustment member 50 thereof includes a fixing seat 51, a knife 52 and an adjustment portion 53. Wherein, the fixing seat 51 is inserted in the receiving groove 33 having a space for moving up and down and to fixedly clamp the knife 52. The blade of the knife 52 is revealed at the lower edge of the fixing seat 51, a rod 54 having thereon an external thread is extended from the fixing seat 51 to the positioning groove 34.

The adjustment portion 53 is provided above the positioning groove 34, the bottom thereof is provided with a rotation axle 55 with a recessed annular neck. The rotation axle 55 is placed downwards in the positioning groove 34 from above, a pin 56 is inserted into the lateral side of the upper clamping arm 31 to engaged in the recessed annular neck of the rotation axle 55, therefore, the rotation axle 55 and the adjustment portion 53 are limited to only rotation but are restrained from up and down displacement. The center of the adjustment portion 53 is provided with a connecting slot 57 to connect with the rod 54 by means of an inner thread which is provided on the inner wall of the connecting slot 57 and is in corresponding to the external thread provided on the rod 54.

By providing the above structure, when a user rotates the adjustment portion 53, the rotation axle 55 is limited by the pin 56 to not displacing up and down; while the fixing seat 51 is inserted in the receiving groove 33 having a space only for moving up and down; therefore, when the adjustment portion 53 is rotated, by thread connection of the connecting slot 57 and the rod 54, the fixing seat 51 and the knife 52 will move up and down relative to the wire recesses 43 to thereby adjust the distance between the knife 52 and the wire recesses 43. In this way, the peeling pliers can suit wires of various sizes.

In FIG. 7, when the adjustment member 50 is rotated to send knife 52 into the lower clamping arm 41, the knife 52 enters the cavity formed between and below recesses 43, as shown in FIGS. 6 and 7, but not shown in FIG. 5.

The above contents and the embodiment are only for illustrating a preferred embodiment of the present invention. It will be apparent to those skilled in this art that various modifications or changes can be made to the elements of the present invention without departing from the spirit, scope and characteristic of this invention. Accordingly, all such modifications and changes also fall within the scope of the appended claims and are intended to form part of this invention.

What is claimed is:

1. A pair of rotational peeling pliers comprising:

an upper half part;

a lower half part;

an adjustment member;

middle sections of said upper and said lower half parts are connected with each other to form upper and lower clamping arms on front sections of said pliers as well as an upper and lower handle on rear section of said pliers;

said upper clamping arm is provided with a knife including a blade, said lower clamping arm is provided with one or more wire recesses;

when one of said recesses receives an electric wire to lie therein, and said upper and lower clamping arms are pressed towards each other, said knife cuts into an outer insulation layer of the wire to peel the outer insulation layer, the blade includes a linear cutting edge perpendicular to the longitudinal length of the wire positioned in one of the wire recesses;

said upper clamping arm is provided with a receiving groove which is further provided on an upper portion thereof with a positioning groove; said adjustment member includes a fixing seat, said knife and an adjustment portion, wherein, said fixing seat is inserted in said receiving groove to fixedly clamp said knife;

the blade of said knife is extended at a lower edge of said upper clamping arm;

a threaded rod is extended from said fixing seat to said positioning groove;

said adjustment portion is provided above said positioning groove, the adjustment portion is provided with a threaded connecting slot which receives said threaded rod;

when rotating said adjustment portion, said rod of said fixing seat is adapted to be movable up and down in said connecting slot to adjust the distance between said knife and said wire recesses; and wherein, said adjustment portion is provided on the bottom thereof with a rotation axle having a recessed annular neck, said rotation axle is placed downwards in said positioning groove, a pin is inserted into a lateral side of said upper clamping arm to engage in said recessed annular neck of said rotation axle, and said rotation axle and said adjustment portion are restrained from up and down displacement.

\* \* \* \* \*